(12) United States Patent  
Oh

(10) Patent No.: US 8,405,793 B2  
(45) Date of Patent: Mar. 26, 2013

(54) BACKLIGHT UNIT AND LCD HAVING THE SAME

(75) Inventor: Myong Rock Oh, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/490,049

(22) Filed: Jun. 6, 2012

(65) Prior Publication Data

US 2012/0242928 A1 Sep. 27, 2012

Related U.S. Application Data

(62) Division of application No. 12/161,269, filed as application No. PCT/KR2007/000031 on Jan. 3, 2007, now Pat. No. 8,215,817.

(30) Foreign Application Priority Data

Jan. 24, 2006 (KR) .......................... 10-2006-0007305

(51) Int. Cl.  
*G02F 1/1333* (2006.01)  
*G02F 1/1335* (2006.01)  
*F21V 7/04* (2006.01)

(52) U.S. Cl. ............... 349/58; 349/61; 349/62; 362/632; 362/633; 362/634

(58) Field of Classification Search .................... 349/58, 349/60–62; 362/632–634  
See application file for complete search history.

(56) References Cited

U.S. PATENT DOCUMENTS

| 7,565,054 | B2 * | 7/2009 | Rinko ......................... 385/146 |
| 2003/0164914 | A1 | 9/2003 | Weber et al. |
| 2003/0164918 | A1 | 9/2003 | Kela et al. |
| 2004/0233348 | A1 * | 11/2004 | Mai ............................... 349/69 |
| 2005/0030728 | A1 * | 2/2005 | Kawashima et al. .......... 362/31 |
| 2005/0259443 | A1 | 11/2005 | Lin |

FOREIGN PATENT DOCUMENTS

| JP | 6342603 A | 12/1994 |
| JP | 8234676 A | 9/1996 |
| JP | 2005-116267 A | 4/2005 |
| KR | 10-2002-0014130 A | 2/2002 |
| KR | 10-2005-0093329 A | 9/2005 |
| KR | 10-2005-0105823 A | 11/2005 |

* cited by examiner

*Primary Examiner* — Nathanael R Briggs  
(74) *Attorney, Agent, or Firm* — Birch, Stewart, Kolasch & Birch, LLP

(57) ABSTRACT

A backlight unit and a liquid crystal display device having the backlight unit are discussed. According to an embodiment, the backlight unit includes a frame including an opening, a light guide plate attached to the frame and formed larger than the opening, an adhesive member formed between the light guide plate and the frame, a colored light source providing colored light to the light guide plate, and a fluorescent excitation sheet formed on the light guide plate to emit colored light incident through the light guide plate as white light, wherein the adhesive member is disposed around lateral sides of the light guide plate.

14 Claims, 4 Drawing Sheets

BACKLIGHT UNIT AND LCD HAVING THE SAME

CROSS REFERENCE TO RELATED APPLICATIONS

This application is a Divisional of application Ser. No. 12/161,269 filed on Jul. 17, 2008, now U.S. Pat. No. 8,215,817 which is a National Phase of PCT International Application No. PCT/KR2007/000031 filed on Jan. 3, 2007, which claims priority to Application No. 10-2006-0007305 filed in the Republic of Korea on Jan. 24, 2006. The entire contents of all of the above applications are hereby incorporated by reference.

TECHNICAL FIELD

The present invention relates to a backlight unit and a liquid crystal display device having the same.

BACKGROUND ART

A cathode ray tube (CRT) has been widely used as one of display devices for displaying image data on a screen. However, the CRT has been inconvenient for use because it has a large volume and a heavy weight for its display area.

A thin flat display device, which has a slim profile and a large display area and thus can be used conveniently anywhere, has been developed and is gradually replacing the CRT.

A liquid crystal display device (LCD) is driven using characteristics of liquid crystals, optical anisotropy and polarization. Since liquid crystal molecules are long and thin, the alignment of liquid crystal molecules has directivity. The alignment direction of the molecules may be controlled by artificially applying electric field to liquid crystals. Therefore, light can be transmitted or blocked according to the direction alignment of the liquid crystal molecules through the optical anisotropy of liquid crystals to display a color and an image.

Since the LCD cannot emit light by itself, it displays an image using light provided from an external light source or a backlight unit.

FIGS. 1 and 2 are an exploded perspective view and a partial enlarged view for illustrating a coupling structure of a light guide plate and a frame of a related art backlight unit.

Referring to FIGS. 1 and 2, the related art backlight unit includes a frame 10 and a light guide plate 20. A first recess 11 and a second recess 13 are formed at an inner side of the frame 10. The first and second recesses 11 and 13 are alternately formed and face different directions from each other. That is, the first recess 11 is formed on an upper surface of the frame 10, while the second recess 13 is formed on an under surface of the frame 10. A first protrusion 21 and a second protrusion 23 are formed at a side surface of the light guide plate 20. The first and second protrusions 21 and 23 are alternately formed and face different directions from each other. That is, the first protrusion 21 is formed at an upper portion of the side surface of the light guide plate 20, while the second protrusion 23 is formed at an under portion of the side surface of the light guide plate 20.

In the backlight unit having the above-mentioned structure, the first recess 11 is coupled to the first protrusion 21 and the second recess 13 is coupled to the second protrusion 23, and thereby coupling the frame 10 to the light guide plate 20.

FIG. 3 is a view for illustrating a design criteria of a related art backlight unit.

Referring to FIG. 3, the related art backlight unit may be divided into a light guide plate region, a light emitting region, and an image display region. The light guide plate region may be defined by a width $a_W$ and a length $a_L$ of the light guide plate, the light emitting region may be defined by a width $b_W$ and a length $b_L$ of the light emitting region, and the image display region may be defined by a width $c_W$ and a length $c_L$ of the image display region. The image display region corresponds to an active region of the LCD.

The light emitting region is approximately 0.5 mm larger than the image display region. The light guide plate region is approximately 0.5 mm larger than the light emitting region. An opening region in the middle of the frame 10 is approximately 0.05-0.1 mm larger than the light guide plate 20.

In a small-sized backlight unit having the above-mentioned structure, light emitted from a lateral side of the light guide plate 20 may be reflected on a sidewall of the frame 10 and be incident to the light guide plate 20. Here, light of a band shape delicately shows on an outer edge of the light emitting region due to light reflected on the sidewall.

Also, the light guide plate having a thickness of 0.3 mm or smaller has been required, but it is difficult to form protrusions for coupling such a thin light guide plate to a frame. Although the protrusions are formed, they may be broken due to their frangibility. When the protrusions are broken, the broken pieces move into the light emitting region to affect image display.

DISCLOSURE OF INVENTION

Technical Problem

An embodiment of the present invention provides a backlight unit capable of stably coupling a frame to a thin light guide plate and preventing transmission caused by light emitted from a lateral side of the light guide plate, reflected on a sidewall of the frame, and incident to the light guide plate.

An embodiment of the present invention is to provide a liquid crystal display device and a mobile communication terminal that can be manufactured in a slim type by having a backlight unit capable of stably coupling a frame to a thin light guide plate and preventing transmission caused by light emitted from a lateral side of the light guide plate, reflected on a sidewall of the frame, and incident to the light guide plate.

Technical Solution

An embodiment of the present invention provides a backlight unit comprising: a frame including an opening; a light guide plate attached to the frame and formed larger than the opening; a light absorption adhesive member attaching the light guide plate to the frame and absorbing incident light; and a white light source providing white light to the light guide plate.

An embodiment of the present invention provides a backlight unit comprising: a frame including an opening; a light guide plate attached to the frame and formed larger than the opening; an adhesive member formed between the light guide plate and the frame; a colored light source providing colored light to the light guide plate; and a fluorescent excitation sheet formed on the light guide plate to emit colored light incident through the light guide plate as white light.

An embodiment of the present invention provides a liquid crystal display device comprising: a backlight unit including a frame including an opening, a light guide plate attached to the frame and formed larger than the opening, a light absorption adhesive member attaching the light guide plate to the frame and absorbing incident light having color, and a white light source providing white light to the light guide plate; and a liquid crystal panel receiving light from the backlight unit to display an image.

An embodiment of the present invention provides a liquid crystal display device comprising: a backlight unit including a frame including an opening, a light guide plate attached to the frame and formed larger than the opening, an adhesive member formed between the light guide plate and the frame, a colored light source providing colored light to the light guide plate, and a fluorescent excitation sheet formed on the light guide plate to emit colored light incident through the light guide plate as white light; and a liquid crystal panel receiving light from the backlight unit to display an image.

An embodiment of the present invention provides a mobile communication terminal comprising: a backlight unit including a frame including an opening, a light guide plate attached to the frame and formed larger than the opening, a light absorption adhesive member attaching the light guide plate to the frame and absorbing incident light having color, and a white light source providing white light to the light guide plate; a liquid crystal panel receiving light from the backlight unit to display an image; a communication unit performing a communication with the outside; and a control unit controlling the backlight unit, the liquid crystal panel, and the communication unit.

An embodiment of the present invention provides a mobile communication terminal comprising: a backlight unit including a frame including an opening, a light guide plate attached to the frame and formed larger than the opening, an adhesive member formed between the light guide plate and the frame, a colored light source providing colored light to the light guide plate, and a fluorescent excitation sheet formed on the light guide plate to emit colored light incident through the light guide plate as white light; a liquid crystal panel receiving light from the backlight unit to display an image; a communication unit performing a communication with the outside; and a control unit controlling the backlight unit, the liquid crystal panel, and the communication unit.

Advantageous Effects

According to a backlight unit of the embodiment, a frame can be stably coupled to a thin light guide plate and transmission can be prevented, which is caused by light emitted from a lateral side of the light guide plate, reflected on a sidewall of the frame, and incident to the light guide plate.

According to a backlight unit of the embodiment, an assembling process thereof can be automated.

According to a liquid crystal display device and a mobile communication terminal of the embodiment, they can be manufactured in a slim type by having a backlight unit capable of stably coupling a frame to a thin light guide plate and preventing transmission caused by light emitted from a lateral side of the light guide plate, reflected on a sidewall of the frame, and incident to the light guide plate.

MODE FOR THE INVENTION

It will be understood that when a layer (or film), a region, patterns, or a structure is referred to as being 'on' or 'under' another layer (or film), region, or patterns, it can be directly on the other layer (or film), region, or patterns, or intervening layers may also be present.

An embodiment of the present invention will be described below in detail with reference to the accompanying drawings.

Figure 1:
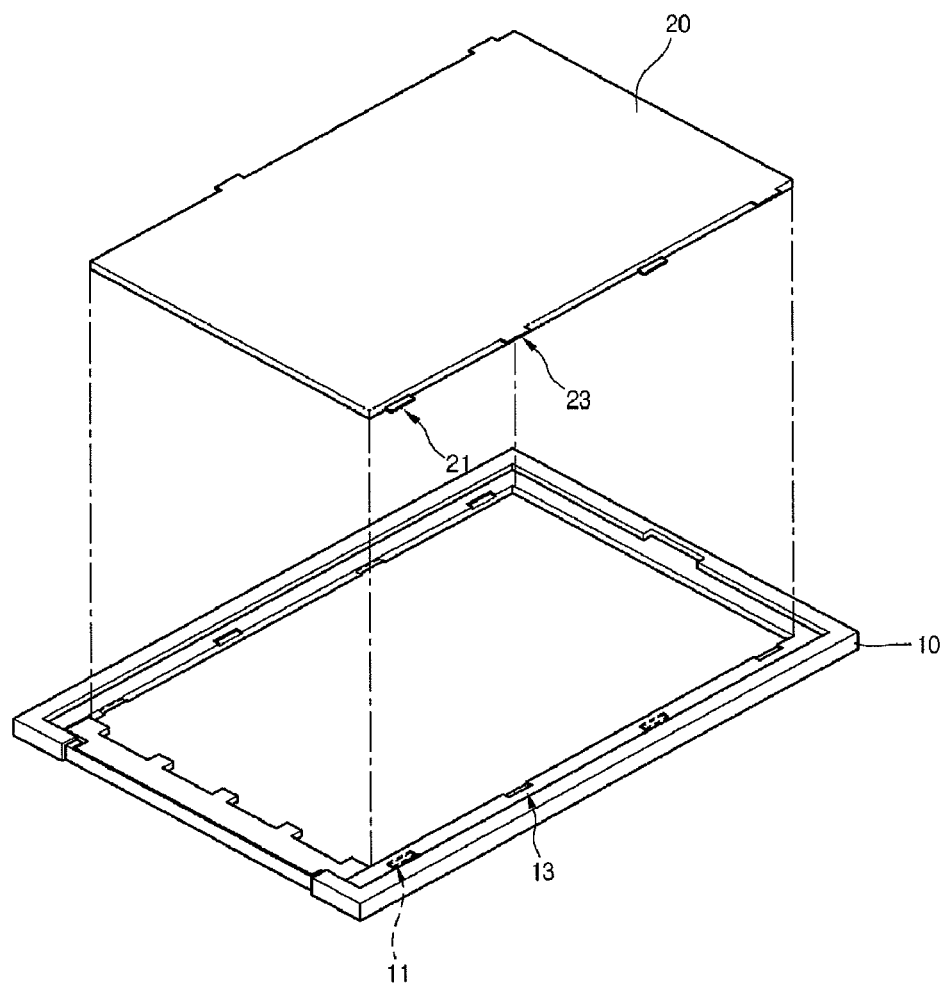
FIGS. 1 and 2 are an exploded perspective view and a partial enlarged view for illustrating a coupling structure of a light guide plate and a frame of a related art backlight unit.
Figure 2:
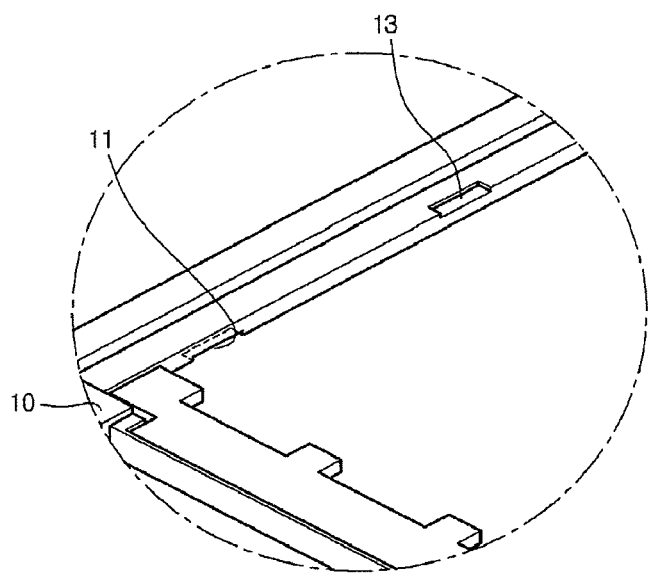
Figure 3:
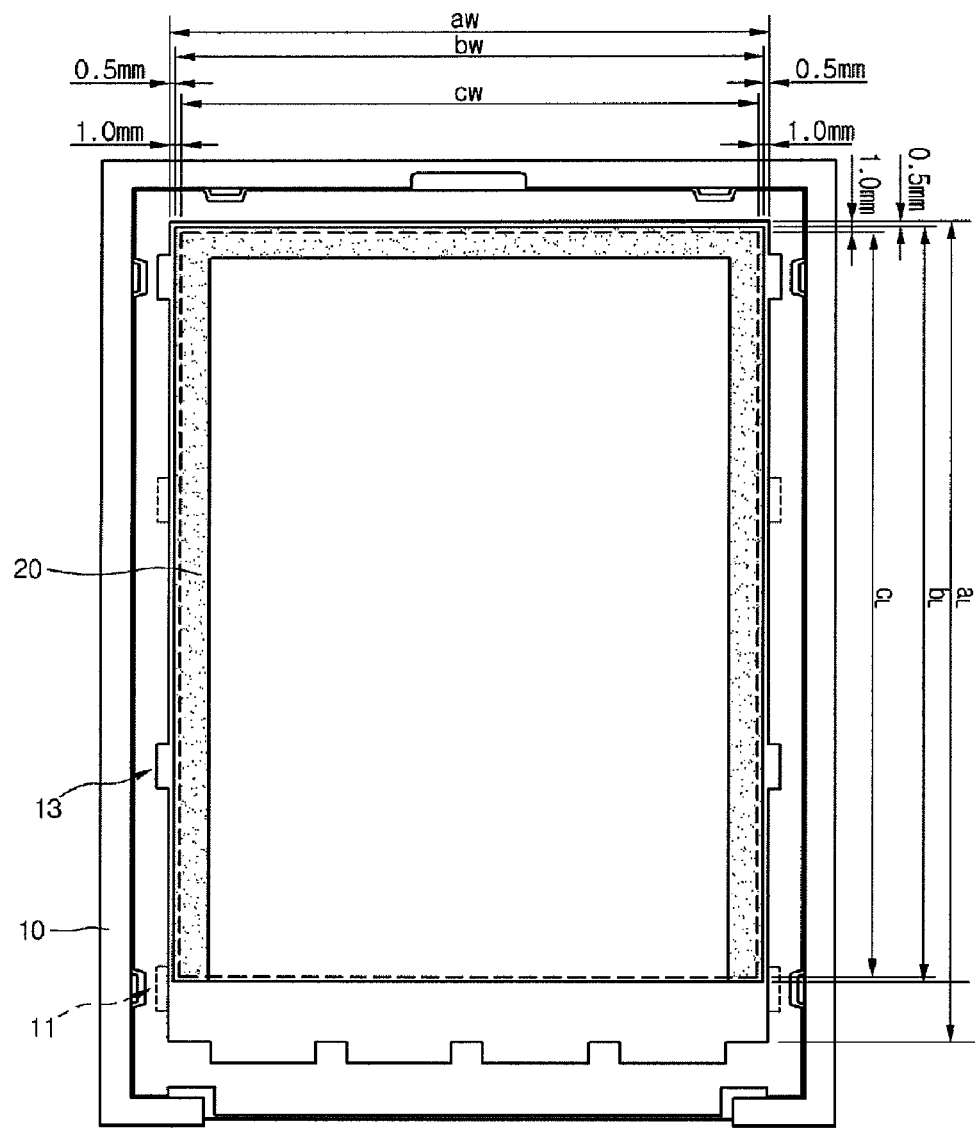
FIG. 3 is a view for illustrating design criteria of a related art backlight unit.
Figure 4:
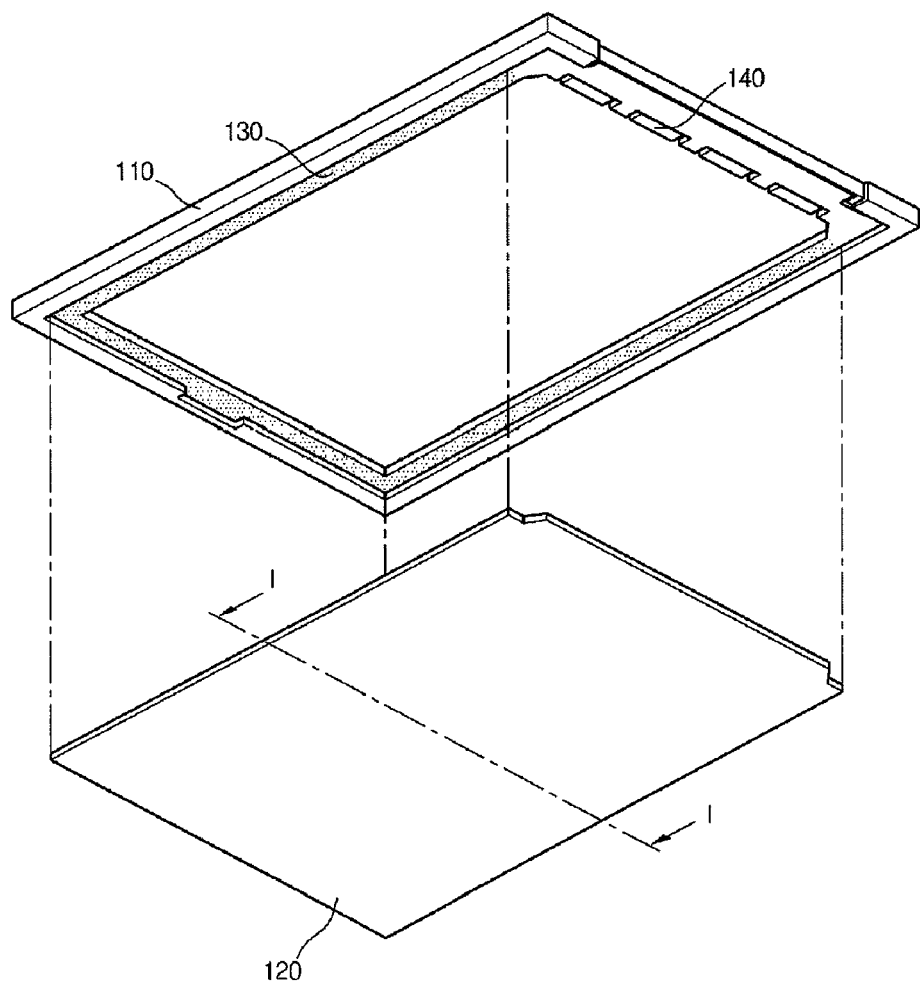
FIGS. 4 and 5 are a bottom perspective view and a sectional view for illustrating a coupling structure of a light guide plate and a frame of a backlight unit according to an embodiment of the present invention.
Figure 5:
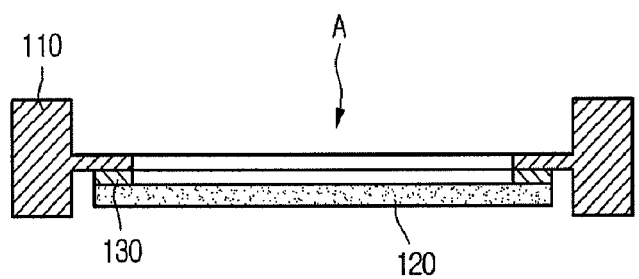

FIG. 4 is a bottom perspective view for illustrating a coupling structure of a light guide plate and a frame of a backlight unit according to an embodiment of the present invention, and FIG. 5 is a cross-sectional view taken along a line I-I of FIG. 4.

Referring to FIGS. 4 and 5, the backlight unit according to an embodiment of the present invention includes a frame 110, a light guide plate 120, an adhesive member 130, and a light emitting part 140. An opening A is formed in the frame 110, and the light guide plate 120 is formed larger than the opening A. The adhesive member 130 is formed on a rim of the frame 110 and attaches the light guide plate 120 to the frame 110. The light emitting part 140 is formed at one end of the frame 110 to provide light.

FIGS. 4 and 5 illustrates the coupling structure of the light guide plate 120 and the frame 110. A shape of the frame 110 may be variously changed, and an object for receiving light, for example, a liquid crystal panel, may be disposed over the frame 110.

The adhesive member 130 may be selected from a two-sided adhesive tape, silicon, and epoxy. The light guide plate 120 according to an embodiment of the present invention is attached to the frame 110 using the adhesive member 130, and thus may be formed to a small thickness. For example, the light guide plate 120 may be formed to a thickness of 0.3 mm or smaller, and may be stably attached to the frame 110 using the adhesive member 130.

The light guide plate 120 may be 1.5-2.0 mm larger than a light emitting region of the light guide plate 120. Therefore, according to the backlight unit of the embodiment, light reflected on a side surface of the frame 110 can be prevented from being incident to the light emitting region of the light guide plate 120. This can prevent transmission on an outer edge of the light emitting region of the light guide plate 120 caused by the light reflected on the side surface of the frame 110.

In an embodiment of the backlight unit having the above-mentioned structure, a light source may be used as the light emitting part 140, and a light absorption adhesive member may be used as the adhesive member 130.

The light absorption adhesive member including color can absorb light incident from the light emitting part 140. The light absorption adhesive member can more effectively prevent light reflected on a side surface of the frame 110 from being incident to the light emitting region of the light guide plate 120. Therefore, this can prevent transmission on an outer edge of the light emitting region of the light guide plate 120 caused by the light reflected on the side surface of the frame 110. The light absorption adhesive member may be selected from a two-sided adhesive tape, silicon, and epoxy.

The light emitting part 140 provides white light to the light guide plate 120, and for example, may be a light emitting diode. The light emitting part 140 may include red/green/blue light emitting diodes or a white light emitting diode.

Figure 6:
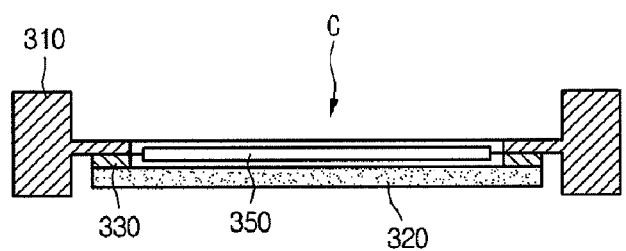
FIG. 6 is a sectional view of a backlight unit according to another embodiment of the present invention.

Next, a backlight unit according to another embodiment of the present invention will be described with reference to FIG. 6. FIG. 6 illustrates a backlight unit that employs a colored light source and a fluorescent excitation sheet.

Referring to FIG. 6, the backlight unit according to another embodiment of the present invention includes a frame 310, a light guide plate 320, an adhesive member 330, and a fluorescent excitation sheet 350. Also, the backlight unit includes a colored light source as a light emitting part.

The light guide plate 320 is attached to the frame 310 using the adhesive member 330. The light guide plate 320 is formed larger than an opening C of the frame 310. The light guide plate 320 may be 1.5-2.0 mm larger a light emitting region of the light guide plate 320. Therefore, according to the backlight unit of the present invention, light reflected on a side surface of the frame 310 can be prevented from being incident to the light emitting region of the light guide plate 320.

The adhesive member 330 having color may absorb light incident from the colored light source. The adhesive member 330 can more effectively prevent light reflected on a side surface of the frame 310 from being incident to the light emitting region of the light guide plate 320. Accordingly, this can prevent transmission on an outer edge of the light emitting region of the light guide plate 320 due to the light reflected on the side surface of the frame 310.

The colored light source provides colored light to the light guide plate 320, and for example, may be a light emitting diode. The colored light source may emit blue light and the fluorescent excitation sheet 350 may include a yellow fluorescent material or red/green fluorescent materials. Alternatively, the colored light source may emit blue/green light, and the fluorescent excitation sheet 350 may include a red fluorescent material. Here, the fact that the fluorescent excitation sheet 350 includes a fluorescent material means that the fluorescent material is included inside the fluorescent ex citation sheet 350 or is coated outside the fluorescent excitation sheet 350.

The fluorescent excitation sheet 350 emits colored light incident from the colored light source as white light. A position of the fluorescent excitation sheet 350 may be changed depending on a shape of the frame 310. FIG. 6 illustrates a coupling structure of the light guide plate 320 and the frame 310. The shape of the frame 310 may be variously changed, and an object for receiving light, for example, a liquid crystal panel may be disposed over the frame. The fluorescent excitation sheet 350 is disposed between the light guide plate 320 and an object for receiving white light, for example, a liquid crystal panel.

The backlight unit having the above-mentioned structure can facilitate the automation of an assembling process of a frame and a light guide plate. The automation of the assembling process can reduce a unit cost.

Figure 7:
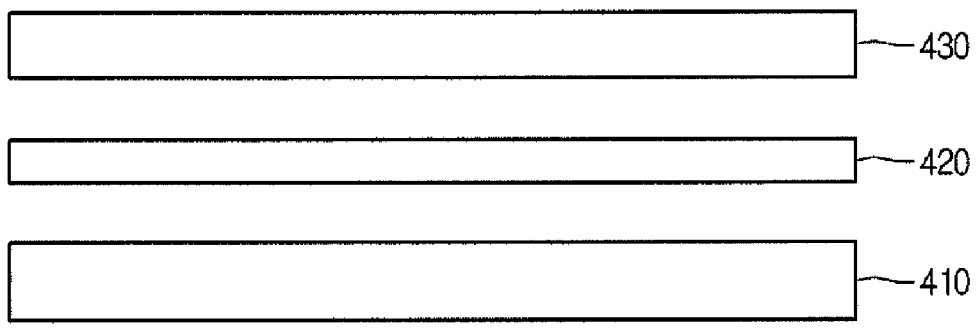
FIG. 7 is a schematic view of an LCD according to an embodiment of the present invention.
Figure 8:
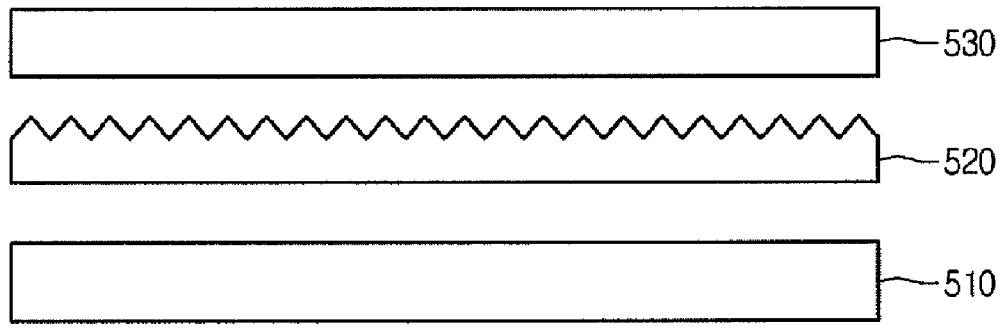
FIG. 8 is a schematic view of an LCD according to another embodiment of the present invention.

The above-described backlight unit may be applied to an LCD and makes it possible to manufacture a slim-sized LCD. FIGS. 7 and 8 are schematic views of an LCD according to an embodiment of the present invention.

Referring to FIG. 7, an LCD according to an embodiment of the present invention includes a backlight unit 410, a prism sheet 420, and a liquid crystal panel 430. The backlight unit 410 includes the backlight unit described with reference to FIGS. 4 to 6. The prism sheet 420 concentrates light emitted from the backlight unit 410 into the liquid crystal panel 430. The liquid crystal panel 430 may display an image using light incident through the prism sheet 420.

Referring to FIG. 8, an LCD according to another embodiment of the present invention includes a backlight unit 510, a transflective polarizing prism sheet 520, and a liquid crystal panel 530. The backlight unit 510 includes the backlight unit described with reference to FIGS. 4 to 6. The transflective polarizing prism sheet 520 concentrates light emitted from the backlight unit 510 into the liquid crystal panel 530. The liquid crystal panel 520 may display an image using light incident through the transflective polarizing prism sheet 520.

The transflective polarizing prism sheet 520 transmits light that is polarized to a predetermined direction and reflects light that is not polarized thereto. For example, the transflective polarizing prism sheet 520 may have a transmission axis parallel to a transmission axis of a polarizer attached to a rear surface of the liquid crystal panel 530. In that case, the polarized light is transmitted through the transflective polarizing prism sheet 520 to be incident to the liquid crystal panel 530 such that the polarized light is transmitted trough the polarizer attached to the liquid crystal panel 530. Light reflected on the transflective polarizing prism sheet 520 may is reflected on components disposed thereunder, and some of the reflected light may be transmitted through the transflective polarizing prism sheet 520 to be incident to the liquid crystal panel 530. Accordingly, when using the transflective polarizing prism sheet 520, the brightness can be improved by more than 30% compared to use of a commonly used prism sheet. An upper surface of the transflective polarizing prism sheet 520 is formed in a prism shape.

The above-described backlight unit or LCD may be applied to a mobile communication terminal, and a slim type mobile communication terminal can be realized. The mobile communication terminal according to an embodiment of the present invention may include the backlight unit described with reference to FIGS. 4 to 6. Also, the mobile communication terminal according to an embodiment of the present invention may include the LCD described with reference to FIGS. 7 and 8.

The mobile communication terminal according to an embodiment of the present invention includes a communication unit for a communication with the outside. The mobile communication terminal according to an embodiment of the present invention includes a control unit that controls the communication unit and the backlight unit or the LCD.

INDUSTRIAL APPLICABILITY

According to a backlight unit of an embodiment of the present invention, a frame can be stably coupled to a slim type light guide plate and transmission on an outer edge of a light emitting region can be prevent, which is caused by light emitted lateral side of the light guide plate, reflected on a side surface of the frame, and incident to the light guide plate.

According to a backlight unit of an embodiment of the present invention, an assembling process thereof can be automated.

An LCD and a mobile communication terminal according to an embodiment of the present invention can be formed in a slim type by having a backlight unit by stably coupling a frame to a slim type light guide plate and preventing transmission on an outer edge of a light emitting region caused by light emitted lateral side of the light guide plate, reflected on a side surface of the frame, and incident to the light guide plate.

The invention claimed is:

1. A backlight unit comprising:
   a frame including an opening;
   a light guide plate attached to the frame and formed larger than the opening;
   an adhesive member formed between the light guide plate and the frame;
   a colored light source providing colored light to the light guide plate; and
   a fluorescent excitation sheet formed on the light guide plate to emit colored light incident through the light guide plate as white light,
   wherein the adhesive member is disposed around lateral sides of the light guide plate, and
   wherein the light guide plate, is 1.5-2.0 mm larger than a light emitting region of the light guide plate to prevent light reflected on a side surface of the frame from being incident to the light emitting region of the light guide plate.

2. The backlight unit according to claim 1, wherein the adhesive member is selected from a two-sided adhesive tape, silicon, and epoxy.

3. The backlight unit according to claim 1, wherein the adhesive member absorbs incident light having color.

4. The backlight unit according to claim 1, wherein the thickness of the light guide plate is 0.3 mm or smaller.

5. The backlight unit according to claim 1, wherein the colored light source emits a blue light and the fluorescent excitation sheet includes a yellow phosphor or red/green fluorescent materials.

6. The backlight unit according to claim 1, wherein the colored light source emits blue/green lights and the fluorescent excitation sheet includes a green fluorescent material.

7. A liquid crystal display device comprising:
   a backlight unit including a frame including an opening, a light guide plate attached to the frame and formed larger than the opening, an adhesive member formed between the light guide plate and the frame, a colored light source providing colored light to the light guide plate, and a fluorescent excitation sheet formed on the light guide plate to emit colored light incident through the light guide plate as white light; and
   a liquid crystal panel receiving light from the backlight unit to display an image,
   wherein the adhesive member is disposed around lateral sides of the light guide plate, and
   wherein the light guide plate, is 1.5-2.0 mm larger than a light emitting region of the light guide plate to prevent light reflected on a side surface of the frame from being incident to the light emitting region of the light guide plate.

8. The liquid crystal display device according to claim 7, comprising a prism sheet formed between the backlight unit and the liquid crystal panel.

9. The liquid crystal display device according to claim 7, comprising a transflective polarizing prism sheet formed between the backlight unit and the liquid crystal panel.

10. The liquid crystal display device according to claim 7, wherein the adhesive member is selected from a two-sided adhesive tape, silicon, and epoxy.

11. The liquid crystal display device according to claim 7, wherein the adhesive member absorbs incident light having color.

12. The liquid crystal display device according to claim 7, wherein the thickness of the light guide plate is 0.3 mm or smaller.

13. The liquid crystal display device according to claim 7, wherein the colored light source emits a blue light and the fluorescent excitation sheet includes a yellow phosphor or red/green fluorescent materials.

14. The liquid crystal display device according to claim 7, wherein the colored light source emits blue/green lights and the fluorescent excitation sheet includes a green fluorescent material.

* * * * *